United States Patent
Sato et al.

[11] Patent Number: 5,990,571
[45] Date of Patent: Nov. 23, 1999

[54] AUTOMOBILE-INSTALLED-APPARATUS CONTROLLER

[75] Inventors: Hiroyuki Sato; Susumu Ito; Tatsuya Yokoyama, all of Furukawa, Japan

[73] Assignee: Alps Electric Co., Ltd., Japan

[21] Appl. No.: 08/880,119

[22] Filed: Jun. 23, 1997

[30] Foreign Application Priority Data

Jun. 26, 1996 [JP] Japan .................................. 8-166237

[51] Int. Cl.$^6$ ...................................................... B60L 1/00
[52] U.S. Cl. ............................................. 307/10.1; 701/36
[58] Field of Search ................................. 307/9.1, 10.1; 701/36; 340/825.3–825.32, 825.34, 825.54, 825.69, 825.72

[56] References Cited

U.S. PATENT DOCUMENTS 5,359,230  10/1994  Namiki et al. .......................... 307/10.1
5,491,418  2/1996  Alfaro et al. ........................... 307/10.1
5,637,928  6/1997  Nakajima et al. ...................... 307/10.1

FOREIGN PATENT DOCUMENTS 7-262867  10/1995  Japan .

*Primary Examiner*—Richard T. Elms
*Attorney, Agent, or Firm*—Brinks Hofer Gilson & Lione

[57] ABSTRACT

An automobile-installed-apparatus controller includes: a plurality of types of control-designation units having different switching functions and built-in discrimination devices with different circuit constants; unit mounts on which the plurality of types of control-designation units are capable of being mounted; and a control-designation-unit determiner in which when any one of the plurality of types of control-designation units is mounted on the unit mount, a value dependent on the circuit constant of the built-in discrimination device is detected, and the type of the mounted control-designation unit is determined based on the detected result.

19 Claims, 3 Drawing Sheets

AUTOMOBILE-INSTALLED-APPARATUS CONTROLLER

BACKGROUND OF THE INVENTION

1. Field of the Invention

The present invention relates to automobile-installed-apparatus controllers provided with members used for operation and designation of the contents of control, such as switches and variable resistors, and in particular to an automobile-installed-apparatus controller in which when an optional control-designation unit among a plurality of types of control-designation units having different switching functions is mounted on a switch mount of a control apparatus, for which the type of switching function of the mounted control-designation unit can be automatically determined by the control apparatus.

2. Description of the Related Art

Conventionally, a plurality of manual switches for adjusting air-conditioning inside an automobile are arranged on the panel surface of an instrument panel in the automobile. By selectively operating a switch among the plurality of switches, the air-conditioning inside the automobile can be switched to cooling or heating, and temperature for cooling or temperature for heating can be increased or decreased.

In addition, recently, in accordance with users' demands, a switching apparatus has been proposed, in which the panel surface of an instrument panel is provided with switch mounts on which a plurality of manual switches for options can be mounted other than a plurality of manual switches for controlling air-conditioning inside an automobile. In other words, the switching apparatus has unit mounts on which a plurality of types of control-designation units can be mounted, and can cope with user's options by employing a structure in which one or a plurality of different types of control-designation units for achieving user-demanded functions: for example, adjustment of the optical axes of headlights, control of fog lamp activation, opening the trunk, and so forth are mounted on the unit mounts, and the mounted control-designation units are switched.

In this case, according to the proposed switching apparatus, any type of control-designation unit can be mounted on the unit mount, and a switching signal from the mounted control-designation unit is processed by a control unit (CPU) of a controller, thereby, even when any type of control-designation unit is mounted on the unit mount, the function of the control-designation unit can be achieved by operating the switch of the mounted control-designation unit.

Incidentally, concerning a known switching apparatus as described, an automobile-installed-apparatus controller provided with the function of automatically determining the type of a control-designation unit when the unit is mounted on a unit mount has been devised. One example of the apparatus is a switching apparatus disclosed in Japanese Unexamined Patent Application No. 7-262867.

The switching apparatus disclosed in Japanese Unexamined Patent Application No. 7-262867 comprises a plurality of types of control-designation units, a control apparatus for selectively mounting the control-designation units on unit mounts, and a control-circuit unit included in the control apparatus, wherein the control-designation units are provided with recognition-signal generating means for generating recognition signals peculiar to the respective control-designation units, and the control-circuit unit is provided with a switch-discrimination circuit for generating a driving signal for driving a predetermined load on receiving the recognition signal. In this case the recognition-signal generating means has different internal interconnections for the types of control-designation units, and outputs a different recognition signal (switching signal) when the switch of the control-designation unit is operated (turned on). The switch-discrimination circuit has a plurality of logic circuits, a plurality of input terminals and a plurality of output terminals. When the recognition signal (switching signal) from the mounted control-designation unit is supplied to any one of the plurality of input terminals, the switch-discrimination circuit outputs a driving signal (switching signal) to be supplied to a load, which corresponds to the function of the control-designation unit mounted on any one of the output terminals, in accordance with the input terminal and the polarity of the supplied signal (switching signal)

As described above, according to the switching apparatus disclosed in Japanese Unexamined Patent Application No. 7-262867, control-designation units of desired types are mounted on unit mounts of a control-circuit unit, and when a switch of a control-designation unit is turned on, a recognition signal peculiar to a function of the control-designation unit is generated from the control-designation unit and is supplied to a switch-discrimination circuit of the control-designation unit, and the type of the mounted control-designation unit is determined based on the recognition signal received by the switch-discrimination circuit. Thus, only by exchanging control-designation units to be mounted on the unit mounts, the control-designation units with various functions can be automatically determined, and an operation corresponding to the function of the mounted control-designation unit can be executed.

Also, according to the switching apparatus disclosed in Japanese Unexamined Patent Application No. 7-262867, by mounting a control-designation unit on a unit mount of a control-circuit unit, discrimination between control-designation units with various functions can be automatically performed and an operation corresponding to the function of the mounted control-designation unit can be executed. In order to discriminate between the functions of the control-designation units, the different types of control-designation units must have different internal interconnections including switches, and the control-circuit unit must have a switch-discrimination circuit including a plurality of logic circuits, a plurality of input terminals and a plurality of output terminals. In addition, the discrimination means for the control-designation units is complicated, so a problem occurs, in which production cost of the control-circuit unit naturally increases.

Moreover, in the switch-discrimination circuit, combinations of logic circuits are inevitably limited, which limits the number of types of control designation units.

SUMMARY OF THE INVENTION

Accordingly, it is an object of the present invention to provide an automobile-installed-apparatus controller which can discriminate between the functions of control-designation units provided with switches and variable resistors by using a very simplified structure without increasing production cost.

To this end, according to an aspect of the present invention, the foregoing object has been achieved through provision of an automobile-installed-apparatus controller including: a plurality of types of control-designation units having different switching functions and built-in discrimination devices with different circuit constants; unit mounts on which the plurality of types of control-designation units can be mounted; and a control-designation-unit determiner in which when any one of the plurality of types of control-designation units is mounted on the unit mount, a value dependent on the circuit constant of the built-in discrimination device is detected, and the type of the mounted control-designation unit is determined based on the detected result.

The discrimination devices with different circuit constants comprise resistor devices with different resistances, and the control-designation-unit determiner for determining the type of the mounted control-designation unit comprises resistor devices combining with the first resistor devices to constitute resistance-type potential dividers, and a controller for determining the type of the mounted control-designation unit by sequentially selecting the divided voltages from the resistance-type potential dividers.

According to another aspect of the present invention, the foregoing object has been achieved through provision of an automobile-installed-apparatus controller including: a plurality of types of control-designation units having different switching functions and built-in discrimination devices with different circuit constants; unit mounts on which the plurality of types of control-designation units are capable of being mounted; and a control-designation-unit determiner in which when any one of the plurality of types of control-designation units is mounted on the unit mount, a value dependent on the circuit constant of the built-in discrimination device is detected, and the type of the mounted control-designation unit is determined based on the detected result, wherein the control-designation-unit determiner for determining the type of the mounted control-designation unit comprises resistor devices combining with the first resistor devices to constitute resistance-type potential dividers, and a control unit for determining the type of the mounted control-designation unit by sequentially selecting the divided voltages from the resistance-type potential dividers.

At least one of the plurality of types of control-designation units includes an indicator lamp.

At least one of the plurality of types of control-designation units includes a light-emitting diode for indicating operation of the control-designation unit.

The plurality of types of control-designation units include a switch for adjusting the quantity of the airflow from an automobile air-conditioner, a switch for adjusting the output position of the airflow, and a switch for adjusting temperature.

In addition, according to a further aspect of the present invention, the foregoing object has been achieved through provision of an automobile-installed-apparatus controller including: a plurality of types of control-designation units having different switching functions and built-in capacitors with different capacitances; unit mounts on which the plurality of types of control-designation units are capable of being mounted; and a control-designation-unit determiner in which when any one of the plurality of types of control-designation units is mounted on the unit mount, a value dependent on the capacitance of the built-in capacitor is detected, and the type of the mounted control-designation unit is determined based on the detected result, wherein the control-designation-unit determiner comprises capacitors combining with the first capacitors to constitute ac-signal-type potential dividers, and a controller for determining by sequentially selecting the divided voltages from the resistance-type potential dividers.

As described above, according to the present invention, when the functions of control-designation units are determined, it is sufficient to provide discrimination devices having circuit constants corresponding to the types of functions of the control designation units in the control-designation units, and it is also sufficient for a control apparatus to detect values dependent on the circuit constants of the discrimination devices included in the control-designation units. Thus, the functions of the control-designation units can be advantageously determined by simplified structure and function, and inexpensive means.

In addition, according to the present invention, in particular, by using resistor devices having different resistances as discrimination devices, and constituting a control-designation-unit determiner for determining types of control-designation units with resistance-type potential dividers including the resistor devices, types of control-designation units can be advantageously determined by more simplified structure and function and most inexpensive means.

DESCRIPTION OF THE PREFERRED EMBODIMENTS

Figure 1:
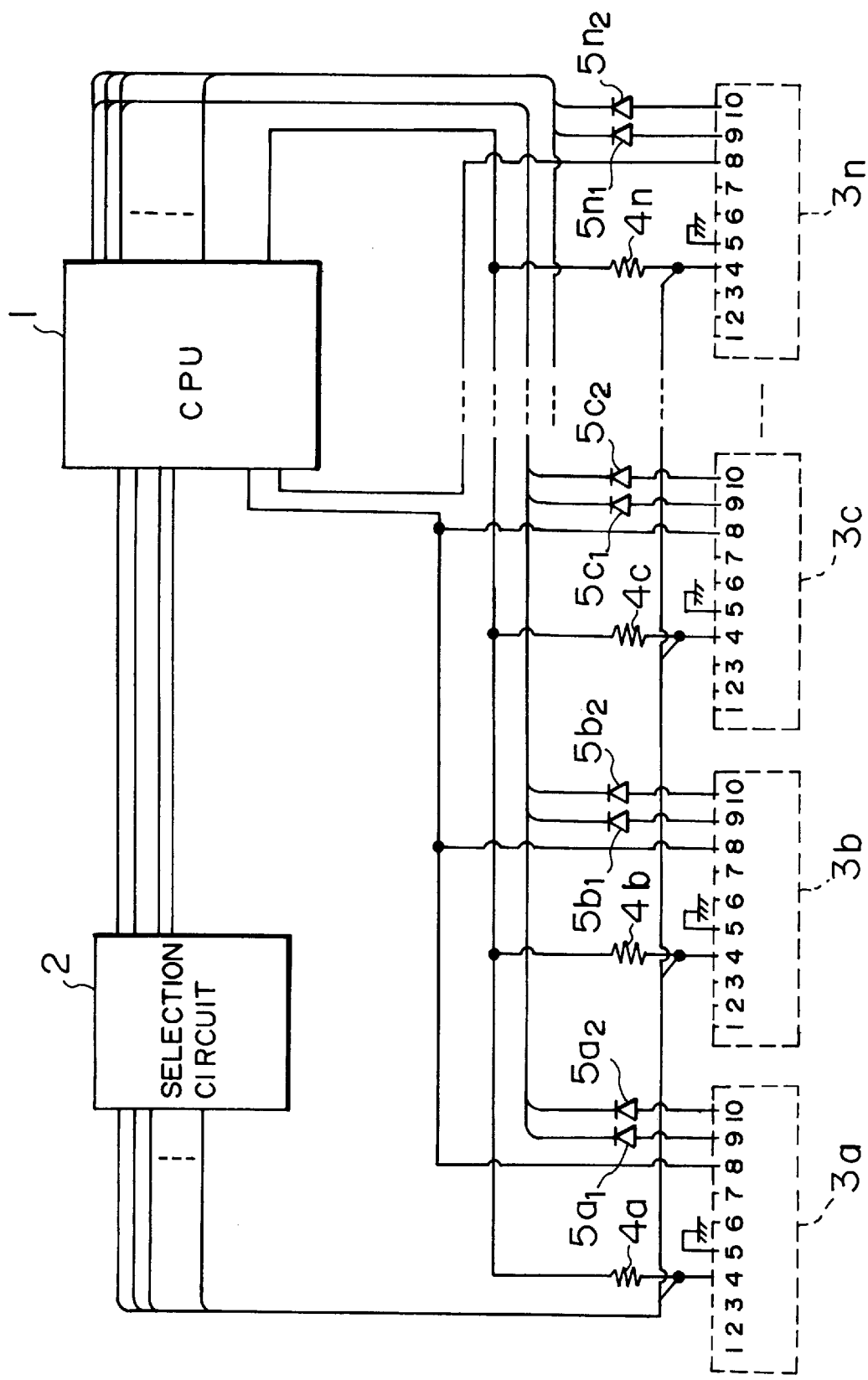
FIG. 1 is a circuit diagram showing main components of an automobile-installed-apparatus controller according to an embodiment of the present invention.

FIG. 1 shows a circuit diagram of main components of an automobile-installed-apparatus controller according to an embodiment of the present invention. FIGS. 2A to 2E are internal diagrams of various control-designation units used in the automobile-installed-apparatus controller according to the present invention. FIG. 3 is an external view showing a case in which the automobile-installed-apparatus controller according to the present invention is built into an automobile-installed control apparatus.

As shown in FIGS. 1 and 2A to 2E, the automobile-installed apparatus controller includes a control unit 1, a selection circuit 2, a plurality of (n) unit mounts 3a, 3b, 3c to 3n, a plurality of (n) type-discrimination resistors 4a, 4b, 4c to 4n, plurality of (2n) buffer diodes $5a_1$, $5a_2$, $5b_1$, $5b_2$, $5c_1$, $5c_2$ to $5n_1$, $5n_2$, and five types of control-designation units 6a, 6b, 6c, 6d, 6e which are selectively mounted on the unit mounts 3a to 3n.

In this case the unit mounts 3a to 3n are rectangular box-shaped. The fronts thereof are provided with operation units, and the backs thereof are each provided with ten pin-receiver terminals Nos. 1 to 10. When any one control-designation unit of the control-designation units 6a, 6b, 6c, 6d, 6e, for example, the control-designation unit 6a is mounted on the unit mounts 3a to 3n, the ten pins Nos. 1 to 10 provided in the unit mounts 3a to 3n are inserted into the pin-receiver terminals Nos. 1 to 10 of the control-designation unit 6a.

As shown in FIG. 1, in the respective unit mounts 3a to 3n, the pins No. 4 are connected to a power-voltage output terminal of the control unit 1 via the type-discrimination resistors 4a to 4n, and are simultaneously connected to the corresponding selection-input terminals of the selection circuit 2, respectively. The respective pins No. 5 are grounded. Concerning the pins No. 8, the pins No. 8 of the unit mounts 3a to 3c are connected in common to one common terminal of the control unit 1, and the pins No. 8 of the unit mounts other than the unit mounts 3a to 3c are connected in common to another common terminal of the control unit 1. The pins No. 9 are connected to the corresponding control terminals of the control unit 1 via the buffer diodes $5a_1$ to $5n_1$, and the pins No. 10 are connected to the corresponding control terminals of the control unit 1 via the buffer diodes $5a_2$ to $5n_2$.

Figure 2A:
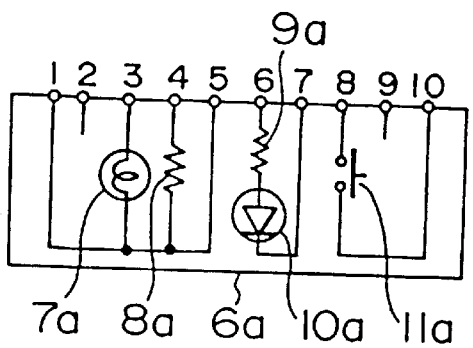
FIGS. 2A to 2E are internal-circuit diagrams showing various control-designation units used in an automobile-mounted apparatus controller according to the present invention.
Figure 3:
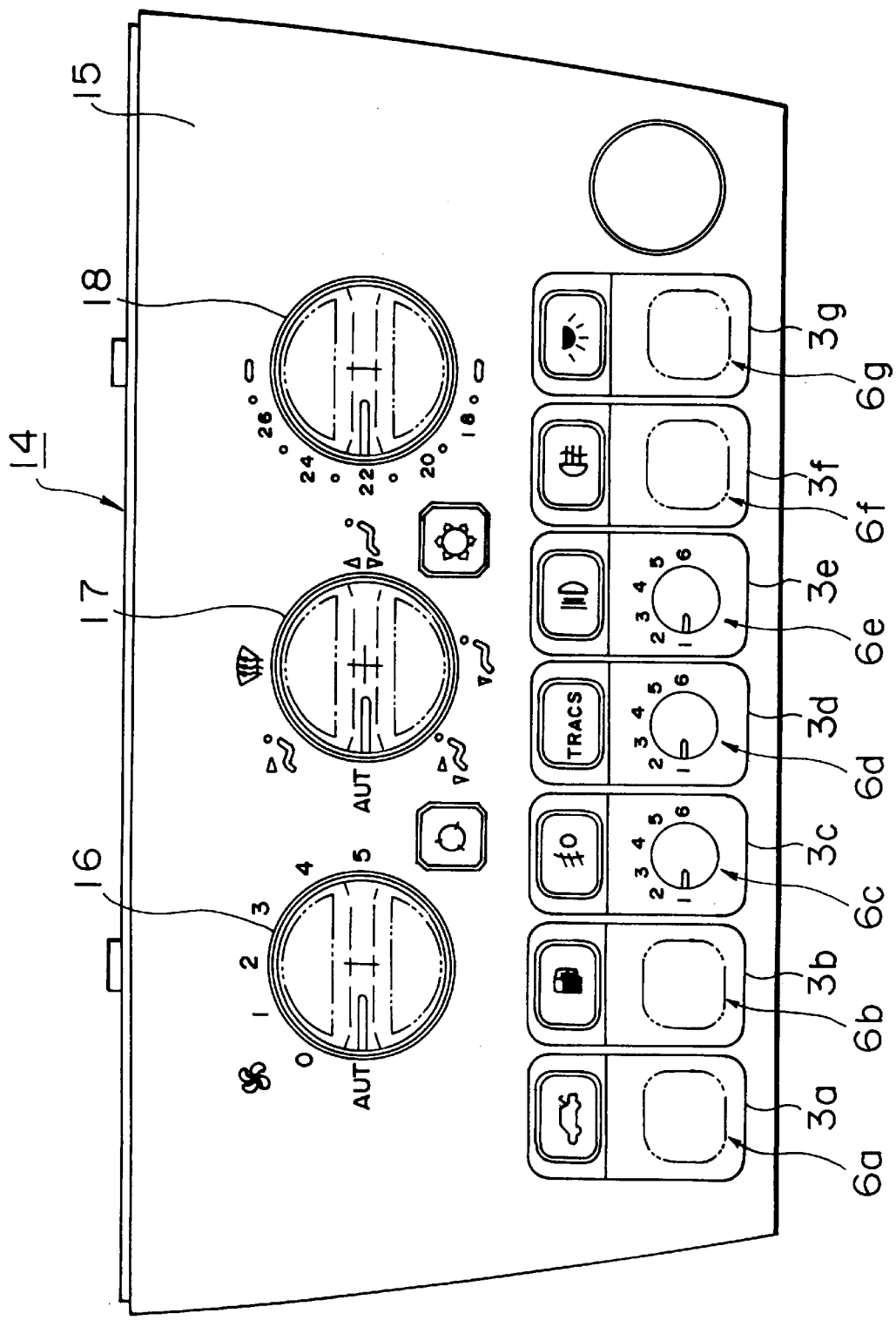
FIG. 3 is a view showing an embodiment in which an automobile-installed-apparatus controller according to the present invention is built into an automobile-installed control apparatus.

In addition, as shown in FIG. 2A, in a control-designation unit 6a, pin-receiver terminal No. 1 and pin-receiver terminal No. 5 are connected in common, an indication lamp 7a is connected between pin-receiver terminal No. 3 and pin-receiver terminal No. 5, and a discrimination resistor 8a is connected between pin-receiver terminal No. 4 and pin-receiver terminal No. 5. A resistor 9a and an operation-indication light-emitting diode (LED) 10a are connected in series between pin-receiver terminal No. 6 and pin-receiver terminal No. 7, and a single-pole switch 11a is connected between pin-receiver terminal No. 8 and pin-receiver terminal No. 10. Pin-receiver terminal No. 2 and pin-receiver terminal No. 9 are free.

Figure 2B:
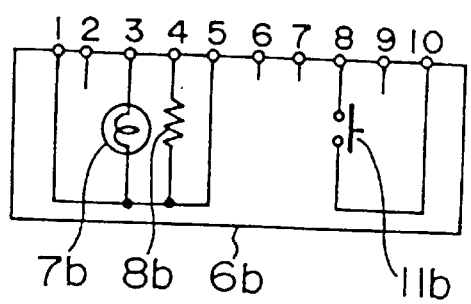

As shown in FIG. 2B, in a control-designation unit 6b, pin-receiver terminal No. 1 and pin-receiver terminal No. 5 are connected in common, an indication lamp 7b is connected between pin-receiver terminal No. 3 and pin-receiver terminal No. 5, and a discrimination resistor 8b is connected between pin-receiver terminal No. 4 and pin-receiver terminal No. 5. A single-pole switch 11b is connected between pin-receiver terminal No. 8 and pin-receiver terminal No. 10. In addition, pin-receiver terminal No. 2, pin-receiver terminal No. 7 and pin-receiver terminal No. 9 are free.

Figure 2C:
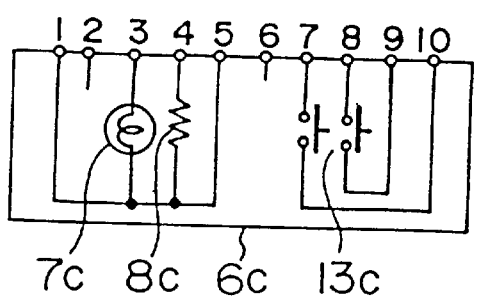

As shown in FIG. 2C, in a control-designation unit 6c, pin-receiver terminal No. 1 and pin-receiver terminal No. 5 are connected in common, an indication lamp 7c is connected between pin-receiver terminal No. 3 and pin-receiver terminal No. 5, and a discrimination resistor 8c is connected between pin-receiver terminal No. 4 and pin-receiver terminal No. 5. A double single-pole switch 13c which is associated by a phase difference is connected between pin-receiver terminal No. 7 and pin-receiver terminal No. 10 and between pin-receiver terminal No. 8 and pin-receiver terminal No. 9. In addition, pin-receiver terminal No. 2 and pin-receiver terminal No. 6 are free.

Figure 2D:
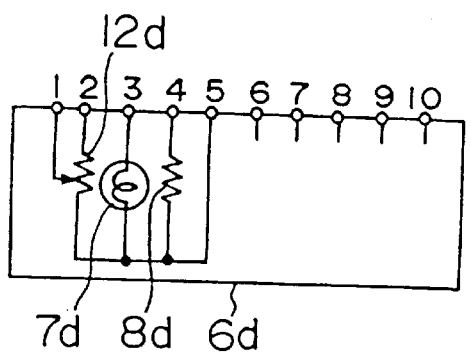

As shown in FIG. 2D, in a control-designation unit 6d, the slider of a variable resistor 12d is connected to pin-receiver terminal No. 1, the resistor portion of the variable resistor 12d is connected between pin-receiver terminal No. 2 and pin-receiver terminal No. 5, a discrimination resistor 8d is connected between pin-receiver terminal No. 4 and pin-receiver terminal No. 5. In addition, pin-receiver terminal No. 6 and pin-receiver terminal No. 10 are free.

Figure 2E:
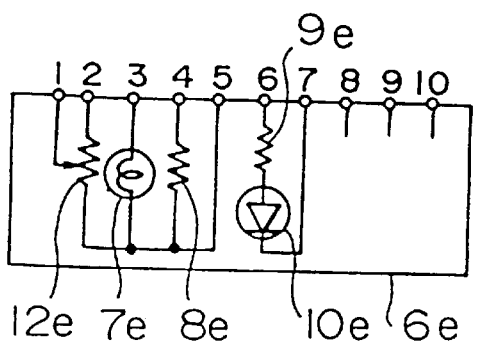

As shown in FIG. 2E, in a control-designation unit 6e, the slider of a variable resistor 12e is connected to pin-receiver terminal No. 1, the resistor portion of the variable resistor 12e is connected between pin-receiver terminal No. 2 and pin-receiver terminal No. 5, and a discrimination resistor 8e is connected between pin-receiver terminal No. 4 and pin-receiver terminal No. 5. A resistor 9e and an operation-indication light-emitting diode 10e are connected in series between pin-receiver terminal No. 6 and pin-receiver terminal No. 7. Pin-receiver terminal No. 8 and pin-receiver terminal No. 10 are free.

In the control-designation units 6a to 6e, the resistances of the internally connected discrimination resistors 8a to 8e are set to different values. For example, discrimination resistors having different resistances are selectively used for the control-designation units 6a to 6c such that the discrimination resistor 8a of the control-designation unit 6a has a resistance of 1 KΩ, the discrimination resistor 8b of the control-designation unit 6b has a resistance of 2 KΩ, and the discrimination resistor 8c of the control-designation unit 6c has a resistance of 3 KΩ.

As shown next in FIG. 3, according to the automobile-mounted apparatus controller in this embodiment, an airflow-output quantity adjustment switch 16 similar to that in a conventional automobile-installed air-conditioning apparatus (air-conditioner) is disposed on the panel surface 15 of the instrument panel 14, and a plurality of unit mounts 3a, 3b, 3c, 3d, 3e, 3f and 3g are arranged adjacent to an airflow-output position adjustment switch 17 and a temperature adjustment switch 18 (Seven unit mounts are shown, but it is obvious that the number is not limited to seven). A control-designation unit provided with a pushbotton switch for opening a trunk is mounted on the unit mount 3a, a control-designation unit provided with a pushbotton switch for opening a fuel-tank cap is mounted on the unit mount 3b, a control-designation unit provided with a variable resistor for adjusting the optical axes of headlights is mounted on the unit mount 3c, a control-designation unit provided with a variable resistor for adjusting traction-control sensitivity is mounted on the unit mount 3d, a control-designation unit provided with a variable resistor for adjusting the light quantity of front fog lamps is mounted on the unit mount 3e, a control-designation unit provided with a pushbotton switch for switching on rear fog lamps is mounted on the unit mount 3f, and a control-designation unit provided with a pushbotton switch for switching on an inside lamp is mounted on the unit mount 3g. The unit mounts display the types of functions of the control-designation units, respectively, with the mounted control-designation units.

Using FIGS. 1 and 2A to 2E, the operations of the switches will be described below.

When one of the control-designation units 6a to 6e, for example, the control-designation unit 6a is mounted on the unit mount 3a, the type-determination resistor 4a and the discrimination resistor 8a of the control-designation unit 6a constitute a resistance-type potential divider, which divides a power-supply voltage (5 V) supplied from the control unit 1 and generates divided voltage $V_{D1}$ at pin No. 4 of the unit mount 3a. At this time, the divided voltage $V_{D1}$ obtained at pin No. 4 is supplied to an input terminal of the selection circuit 2 via lines, the input terminal corresponding to the control-designation unit 6a.

Similarly, when one of the other control-designation units 6b to 6e, for example, the control-designation unit 6b is mounted on the unit mount 3b, the type-determination resistor 4b and the discrimination resistor 8b of the control-designation unit 6b constitute a resistance-type potential divider, which generates at pin No. 4 of the unit mount 3b a voltage $V_{D2}$ divided from the power-supply voltage (5 V) supplied from the control unit 1. Also, in this case the divided voltage $V_{D2}$ obtained at pin No. 4 is supplied to an input terminal of the selection circuit 2 via the lines, the input terminal corresponding to the control-designation unit 6a.

In addition, also when one of the other control-designation units 6c to 6e, for example, the control-designation unit 6c is mounted on the unit mount 3c, the type-determination resistor 4c and the discrimination resistor 8c of the control-designation unit 6c constitute a resistance-type potential divider, which generates at pin No. 4 of the unit mount 3c a voltage $V_{D3}$ divided from the power-supply voltage (5 V) supplied from the control unit 1. Also in this case, the divided voltage obtained at pin No. 4 is supplied to an input terminal of the selection circuit 2 via the lines, the input terminal corresponding to the control-designation unit 6c.

As described below, similarly, when one of the other control designation circuits 6d to 6e, for example, the control-designation unit 6d is mounted on the unit mount 3d, a divided voltage $V_{D4}$ divided by the type-determination resistor 4d and the discrimination resistor 8d of the control-designation unit 6d is obtained at pin No. 4 of the unit mount 3d, and is supplied to an input terminal of the selection circuit 2, the input terminal corresponding to the control-designation unit 6d.

The divided voltages $V_{D1}$, $V_{D2}$, $V_{D3}$ and $V_{D4}$ supplied at the input terminals of the selection circuit 2 are scanned by the control unit 1 so as to be sequentially selected, and the selected divided voltages $V_{D1}$, $V_{D2}$, $V_{D3}$ and $V_{D4}$ are sequentially inputted in the form of digital signals to the control unit 1. In the resistance-type potential dividers consisting of the type-determination resistors 4a to 4d and the discrimination resistors 8a to 8d, the resistances of the type-determination resistors 4a to 4d are all equal, while the resistances of the discrimination resistors 8a to 8d differ corresponding to the control-designation units 6a to 6d. Thus, the inputted divided voltages $V_{D1}$, $V_{D2}$, $V_{D3}$ and $V_{D4}$ have different values for the respective control-designation units 6a to 6d. The control unit 1 holds in the form of a table or the like in advance the voltage values of the divided voltages $V_{D1}$, $V_{D2}$, $V_{D3}$ and $V_{D4}$ sequentially inputted by scanning the selection circuit 2, and the functions of the control-designation units 6a to 6d corresponding to the voltage values of the divided voltages $V_{D1}$, $V_{D2}$, $V_{D3}$ and $V_{D4}$. Accordingly, the control unit 1 determines the functions of the control-designation units 6a to 6d which have generated the divided voltages $V_{D1}$, $V_{D2}$, $V_{D3}$ and $V_{D4}$ by comparing the voltage values of the inputted divided voltages $V_{D1}$, $V_{D2}$, $V_{D3}$ and $V_{D4}$ with the contents of the table. Subsequently, when the switches 11a and 11b, the variable resistors 12d and 12e, and the double single-pole switch 13c are respectively operated, the control unit 1 functions based on the determined results to execute the corresponding control adjustment operations peculiar to the control-designation units 6a to 6e on automobile-installed apparatuses corresponding to the units.

In addition, recognition of difference among the divided voltages can be performed to a minimum of 0.3 V, various types of control-designation units can be recognized.

In this case, whenever the front switch-operation portions of the control-designation units 6a and 6b are pressed, the contact points of the switches 11a and 11b are opened or closed. By turning the front variable resistor operation portions of the control-designation units 6d and 6e, the positions of the sliders of the variable resistors 12d and 12e are intermittently adjusted. Whenever the front switch-operation portion of the control-designation unit 6c is pressed, the contact point of the double single-pole switch 13c is opened or closed.

In this embodiment an arrangement in which the control-designation unit 6a is mounted on the unit mount 3a, the control-designation unit 6b is mounted on the unit mount 3b, the control-designation unit 6c is mounted on the unit mount 3c, and the control-designation unit 6d is mounted on the unit mount 3d has been described. However, operations performed in a case in which any one of the control-designation units 6b to 6e is mounted on the unit mount 3a, any one of the control-designation units 6a or 6c to 6e is mounted on the unit mount 3b, any one of the control-designation units 6a and 6b or 6d and 6e is mounted on the unit mount 3c, and any one of the control-designation units 6a to 6c or 6e is mounted on the unit mount 3d are identical to the above-described operations.

As described above, according to this embodiment, it is sufficient to use arrangements in which discrimination resistors 8a to 8e having different resistances for function types are provided in control-designation units 6a to 6e, type-determination resistors 4a to 4n combining with the discrimination resistors 8a to 8e to constitute resistance-type potential dividers are provided in control apparatuses, and a selection circuit 2 for selecting divided voltages $V_{D1}$, $V_{D2}$, $V_{D3}$ and $V_{D4}$ obtained from the resistance-type potential dividers is provided. Thus, the structure of a control-designation-unit determiner can be simplified compared with this type of switching apparatus for automatically determining the functions of control-designation units.

In addition, according to this embodiment, a control-designation-unit determiner can consist of multipurpose circuit components. Accordingly, production cost of an automobile-installed control apparatus can be reduced.

Figure 2F:
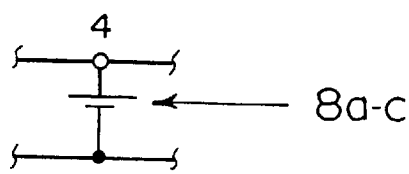
FIG. 2F is a diagram of a capacitor as used in a control-designation unit.

The above-described embodiment has described a case in which discrimination resistors 8a to 8e having different resistances for types of functions, provided in control-designation units 6a to 6e, are used as discrimination devices, and a control apparatus is provided with type-discrimination resistors 4a to 4n combining with discrimination resistors 8a to 8e to constitute resistance-type potential dividers. However, discrimination devices according to the present invention are not limited to the case where discrimination resistors 8a to 8e with different resistances are used, but other capacitors, for example, capacitors such as capacitor 8a–c in FIG. 2F, having different capacitances for the types of the functions of the control-designation units 6a to 6e, are provided, and constant-capacitance capacitors combining with the provided capacitors may be provided in the control apparatus.

The above-described embodiment has described a case in which the automobile-installed-apparatus controller is built into a control apparatus to be mounted on an instrument panel of an automobile, such as the automobile-installed air-conditioning apparatus (air-conditioner) 14. However, an automobile-installed-apparatus controller of the present invention is not limited to the case where it is built into the automobile-installed air-conditioning apparatus (air-conditioner) 14, but may be built into another automobile-installed control apparatus and may be built into a control apparatus similar to the automobile-installed control apparatus.

What is claimed is:

1. An automobile-installed-apparatus controller comprising:
   a plurality of function types of control-designation units having different switching functions and built-in discrimination devices with different circuit constants;
   unit mounts on which said plurality of types of control-designation units are capable of being mounted, any of the control-designation units being mountable on any of the unit mounts;

9 and a control-designation-unit determiner in which when any one of said plurality of types of control-designation units is mounted on said unit mount, a value dependent on the circuit constant of said built-in discrimination device is detected, and the type of the mounted control-designation unit is determined based on the detected result.

2. An automobile-installed-apparatus controller according to claim 1, wherein said discrimination devices with different circuit constants comprise resistor devices with different resistances, and said control-designation-unit determiner for determining the type of the mounted control-designation unit comprises resistor devices combining with said built-in discrimination devices to constitute resistance-type potential dividers, and a control unit for determining the type of the mounted control-designation unit by sequentially selecting the divided voltages from said resistance-type potential dividers.

3. An automobile-installed-apparatus controller according to claim 2, wherein at least one of said plurality of types of control-designation units includes an indicator lamp.

4. An automobile-installed-apparatus controller according to claim 2, wherein at least one of said plurality of types of control-designation units includes a light-emitting diode for indicating operation of said control-designation unit.

5. An automobile-installed-apparatus controller according to claim 2, wherein said plurality of types of control-designation units include a switch for adjusting the quantity of the airflow from an automobile air-conditioner, a switch for adjusting the output position of the airflow, and a switch for adjusting temperature.

6. An automobile-installed-apparatus controller according to claim 1, wherein at least one of said plurality of types of control-designation units includes an indicator lamp.

7. An automobile-installed-apparatus controller according to claim 1, wherein at least one of said plurality of types of control-designation units includes a light-emitting diode for indicating operation of said control-designation unit.

8. An automobile-installed-apparatus controller according to claim 1, wherein said plurality of types of control-designation units include a switch for adjusting the quantity of the airflow from an automobile air-conditioner, a switch for adjusting the output position of the airflow, and a switch for adjusting temperature.

9. An automobile-installed-apparatus controller according to claim 1, wherein an operation corresponding to the function of the mounted control-designation unit can be executed upon determination of the type of the mounted control-designation unit.

10. An automobile-installed-apparatus controller comprising:
a plurality of function types of control-designation units having different switching functions and built-in discrimination devices with different circuit constants;
unit mounts on which said plurality of types of control-designation units are capable of being mounted, any of the control-designation units being mountable on any of the unit mounts;
and a control-designation-unit determiner in which when any one of said plurality of types of control-designation units is mounted on said unit mount, a value dependent on the circuit constant of said built-in discrimination device is detected, and the type of the mounted control-designation unit is determined based on the detected result, wherein said control-designation-unit determiner for determining the type of the mounted control-designation unit comprises resistor devices combining with said built-in discrimination devices to constitute resistance-type potential dividers, and a control unit for determining the type of the mounted control-designation unit by sequentially selecting the divided voltages from said resistance-type potential dividers.

10

11. An automobile-installed-apparatus controller according to claim 10, wherein at least one of said plurality of types of control-designation units includes an indicator lamp.

12. An automobile-installed-apparatus controller according to claim 10, wherein at least one of said plurality of types of control-designation units includes a light-emitting diode for indicating operation of said control-designation unit.

13. An automobile-installed-apparatus controller according to claim 10, wherein said plurality of types of control-designation units include a switch for adjusting the quantity of the airflow from an automobile air-conditioner, a switch for adjusting the output position of the airflow, and a switch for adjusting temperature.

14. An automobile-installed-apparatus controller according to claim 10, wherein an operation corresponding to the function of the mounted control-designation unit can be executed upon determination of the type of the mounted control-designation unit.

15. An automobile-installed-apparatus controller comprising:
a plurality of function types of control-designation units having different switching functions and built-in capacitors with different capacitances;
unit mounts on which said plurality of types of control-designation units are capable of being mounted, any of the control-designation units being mountable on any of the unit mounts;
and a control-designation-unit determiner in which when any one of said plurality of types of control-designation units is mounted on said unit mount, a value dependent on the circuit constant of said built-in capacitor is detected, and the type of the mounted control-designation unit is determined based on the detected result,
wherein said control-designation-unit determiner comprises capacitors combining with said built-in capacitors to constitute ac-signal-type potential dividers, and a control unit for determining the type of the mounted control-designation unit by sequentially selecting the divided voltages from said ac-signal-type potential dividers.

16. An automobile-installed-apparatus controller according to claim 15, wherein an operation corresponding to the function of the mounted control-designation unit can be executed upon determination of the type of the mounted control-designation unit.

17. An automobile-installed-apparatus controller comprising:
a plurality of types of control-designation units having different switching functions and built-in discrimination devices with different circuit constants;
unit mounts on which said plurality of types of control-designation units are capable of being mounted;
and a control-designation-unit determiner in which when any one of said plurality of types of control-designation units is mounted on said unit mount, a value dependent on the circuit constant of said built-in discrimination device is detected, and the type of the mounted control-designation unit is determined based on the detected result, and
wherein said plurality of types of control-designation units include a switch for adjusting the quantity of the airflow from an automobile air-conditioner, a switch for adjusting the output position of the airflow, and a switch for adjusting temperature.

18. An automobile-installed-apparatus controller according to claim 17, wherein said discrimination devices with different circuit constants comprise resistor devices with different resistances, and said control-designation-unit determiner for determining the type of the mounted control-designation unit comprises resistor devices combining with said built-in discrimination devices to constitute resistance-type potential dividers, and a control unit for determining the type of the mounted control-designation unit by sequentially selecting the divided voltages from said resistance-type potential dividers.

19. An automobile-installed-apparatus controller comprising:

a plurality of types of control-designation units having different switching functions and built-in discrimination devices with different circuit constants;

unit mounts on which said plurality of types of control-designation units are capable of being mounted;

and a control-designation-unit determiner in which when any one of said plurality of types of control-designation units is mounted on said unit mount, a value dependent on the circuit constant of said built-in discrimination device is detected, and the type of the mounted control-designation unit is determined based on the detected result, wherein:

said control-designation-unit determiner for determining the type of the mounted control-designation unit comprises resistor devices combining with said built-in discrimination devices to constitute resistance-type potential dividers, and a control unit for determining the type of the mounted control-designation unit by sequentially selecting the divided voltages from said resistance-type potential dividers, and said plurality of types of control-designation units include a switch for adjusting the quantity of the airflow from an automobile air-conditioner, a switch for adjusting the output position of the airflow, and a switch for adjusting temperature.

* * * * *